June 7, 1955   A. SZUNDY   2,710,307
ELECTRICAL DRY CELLS
Filed July 31, 1953

INVENTOR.
ALEXANDRE SZUNDY
BY

United States Patent Office 2,710,307
Patented June 7, 1955

2,710,307

ELECTRICAL DRY CELLS

Alexandre Szundy, Sao Paulo, Brazil

Application July 31, 1953, Serial No. 371,584

Claims priority, application Brazil December 8, 1952

1 Claim. (Cl. 136—106)

The conversion of chemical energy into electrical energy has electromotive force; as a result this conversion is obtained in devices called cells of various types, of which the dry cells are the most adequate for general uses, such as in flashlights, radio batteries and other apparatus.

The usual dry cell (Leclanché system), comprises a container of zinc (negative pole) and a central rod of carbon (positive pole) which is surrounded by a mixture of carbon and manganese oxide, used as a depolarizer. Between this mixture and the inside of the zinc container is the absorbent material, saturated with ammonium chloride and zinc chloride. This type of cell, the best and practically the only commercial type nowadays used, has several disadvantages, such as: excessive amount of zinc necessary in each cell, due to the fact that the anode serves at the same time as a rigid container; unavoidable leakage through the container, damaging the vital parts of the flashlight or radio apparatus.

The present invention deals with improvements of electrical dry cells, by means of which a substantial economy of zinc is provided for; the improved dry cell can be maintained in a flashlight or in a radio apparatus, even after it is discharged, without the danger of damaging leakages.

The improved dry cell comprises a container made out of non-corrosive plastic, internally lined with zinc, the thickness of which is calculated according to the presumed life of the cell; the base of the container is provided with a strip of zinc, connected to the base. The center of this strip is bended outwardly through the material of the base, in a small area to be used as the negative pole of the cell.

Figure 2:
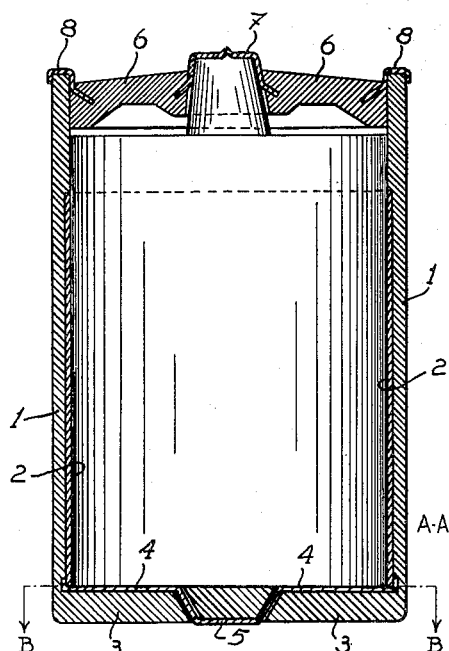
Figure 3:
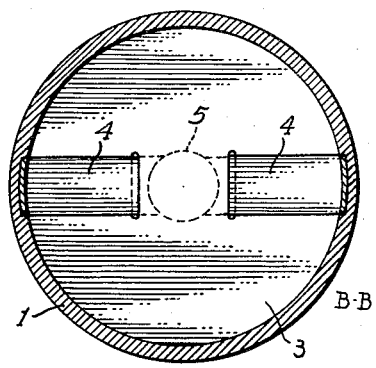
Figure 1:
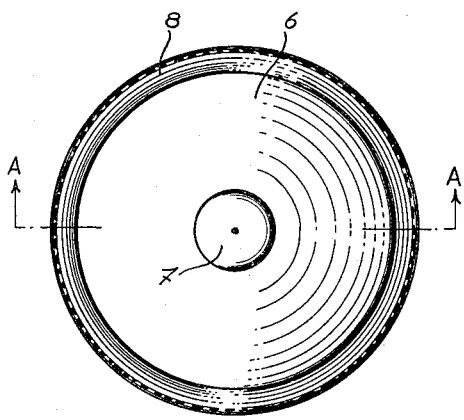

The invention will now be described by way of example with reference to the accompanying drawings, in which:

Fig. 1 is a top view of the improved dry cell.
Fig. 2 is a cross-section on line A—A.
Fig. 3 is a section on line B—B.

The improved dry cell comprises a container 1, of non-corrosive material, which shape is in accordance with the purpose of the several existing models of cells.

The container 1 is provided internally with a lining 2 of zinc, which thickness is calculated to be sufficient for the chemical reactions in the cell. The base 3 of the container is provided with a strip 4 also out of zinc, connected with sheet 2 and bended or curved through said base, in a central part 5, acting as the negative pole of the cell.

The container 1 is provided with a lid 6, also made out of plastic material, with a central contact 7, connected with the axial rod of carbon of the cell; the lid is maintained in position by means of a metallic ring 8, as shown in Fig. 2.

Due to the fact that plastic material is inexpensive and also due to the economy of zinc, the cells manufactured in accordance with this invention shall be available for a lesser price than the usual cells.

The described container is obtained by the direct injection of thermoplastic material over the zinc lining and zinc strip which are previously placed in the mould; these zinc parts shall thus be inlaid in the plastic material.

Technically the improved cell is perfect, superior in many ways to the usual cells for there is no leakage, due to the non-corrosive plastic material used as a container.

Having thus described the invention by means of a non-restrictive example, what I claim is:

Improvements in electrical dry cells, comprising a container made out of non-corrosive plastic material, provided with an internal lining of zinc sheet of small thickness; a strip of zinc connected with said lining, provided with a central part bended or curved through the base of said container, acting as negative pole; a lid also made out of plastic material, provided with a central metallic contact acting as a positive pole, connected with the axial carbon rod of the cell; a metallic ring maintaining said lid in position.

References Cited in the file of this patent

UNITED STATES PATENTS

| | | |
|---|---|---|
| 1,342,001 | Schulte | June 1, 1920 |
| 2,346,640 | Anthony | Apr. 18, 1944 |
| 2,411,272 | Keller | Nov. 19, 1946 |
| 2,419,589 | Paul | Apr. 29, 1947 |
| 2,505,014 | Terlizzi et al. | Apr. 25, 1950 |
| 2,524,668 | Keller | Oct. 3, 1950 |

FOREIGN PATENTS

| | | |
|---|---|---|
| 973,083 | France | Feb. 7, 1951 |